United States Patent [19]
Svensson

[11] Patent Number: 6,032,786
[45] Date of Patent: Mar. 7, 2000

[54] FILLING ARRANGEMENT FOR A BULK UNLOADER

[75] Inventor: Kenneth Svensson, Örkelljunga, Sweden

[73] Assignee: BMH Marine AB, Bjuv, Sweden

[21] Appl. No.: 08/973,341

[22] PCT Filed: Mar. 20, 1996

[86] PCT No.: PCT/SE96/00298

§ 371 Date: Dec. 4, 1997

§ 102(e) Date: Dec. 4, 1997

[87] PCT Pub. No.: WO97/01501

PCT Pub. Date: Jan. 16, 1997

[30] Foreign Application Priority Data

Jun. 27, 1995 [SE] Sweden .................................. 9502335

[51] Int. Cl.[7] .................................................. B65G 65/22
[52] U.S. Cl. ........................ 198/513; 198/511; 198/518; 198/703; 414/140.7; 414/142.5; 414/141.1
[58] Field of Search ................................ 198/307.1, 509, 198/511, 513, 518, 703; 414/140.7, 141.1, 141.9, 142.5

[56] References Cited

U.S. PATENT DOCUMENTS

| | | | |
|---|---|---|---|
| 2,318,658 | 5/1943 | Alvey | 198/703 |
| 3,349,892 | 10/1967 | Barre | 414/141.1 |
| 3,432,024 | 3/1969 | Ludwig | 198/511 |
| 4,236,857 | 12/1980 | Willi | 414/141.1 |
| 4,738,578 | 4/1988 | Johnston | 198/509 |
| 4,903,821 | 2/1990 | Yamaguchi | 198/703 |
| 5,370,490 | 12/1994 | Tschernatsch | 414/140.7 |

FOREIGN PATENT DOCUMENTS

| | | |
|---|---|---|
| 0 173 892 A1 | 3/1986 | European Pat. Off. . |
| 0 284 154 | 9/1988 | European Pat. Off. . |
| 0 284 154 B1 | 9/1988 | European Pat. Off. . |
| 9201558 | 11/1992 | Sweden . |
| 9202034 | 1/1993 | Sweden . |
| 9202085 | 1/1993 | Sweden . |
| 9203430 | 2/1993 | Sweden . |
| 9203112 | 4/1993 | Sweden . |
| 9300832 | 9/1993 | Sweden . |
| 930833 | 9/1993 | Sweden . |
| 9302695 | 2/1994 | Sweden . |
| 1071536A | 2/1984 | U.S.S.R. . |

*Primary Examiner*—Jospeh E. Valenza
*Attorney, Agent, or Firm*—Smith, Gambrell & Russell, LLP

[57] ABSTRACT

The invention concerns a filling arrangement (12) for a bulk unloader having a conveyor belt travelling in an endless path and provided with material receiving pockets (9). The arrangement is characterised by a filler wheel (31) having an essentially horizontal main axis (A) and comprising: two runners (80) which are rotatable about the main axis (A) and against which lateral belt portions (23) of the conveyor belt (10) abut, wherein said pockets (9) are travelling between the runners (80) and are open towards the interior of the filler wheel (31) for receiving material being supplied essentially axially via an inlet opening (39) through a first one of said runners (80), and a tubular wall in the shape of a frustoconical member (70), which has a symmetry axis extending essentially in parallel with said main axis (A) and which is arranged to rotate about said symmetry axis, said frustoconical member (70) diverging from the inlet opening (39) towards the pockets (9) disposed between the runners (80), in order to guide the material into said pockets.

15 Claims, 11 Drawing Sheets

FILLING ARRANGEMENT FOR A BULK UNLOADER

The present invention relates to a filling arrangement for a bulk unloader having a conveyor belt travelling in an endless path and provided with material receiving pockets.

Unloaders of the kind referred to above are described for instance in SE 9201558-5, SE 9202034-6 and SE 9302695-3. In SE 9202034-6 is described a ship unloader comprising a vertically movable horizontal arm and a vertical arm, the latter being supported at the outer end of the horizontal arm for pendulum movements, said conveyor belt travelling in an endless path along the horizontal and vertical arms. The conveyor belt travels around a turning wheel disposed at a lower end of the vertical arm, and adjacent said turning wheel is arranged a screw conveyor receiving bulk material from the ship hull at its lower end and having a peripheral side opening at its upper end, formed in the screw housing, for transferring (of) the material to the conveyor belt pockets. This prior-art unloader, as well as the unloaders described in the other two documents referred to above, is characterised in that the open sides of the pockets are turned away from one another, i.e. the bulk material is loaded and unloaded on the outwardly facing side of the belt. For this reason the material-carrying transportation part of the belt must run above the return part in the horizontal arm, and consequently the return part pockets open downwards in the horizontal arm. A disadvantage inherent in this arrangement is that any remaining material that may be present in the incompletely emptied pockets in the belt return part will be shaken loose from said pockets as the latter are travelling along the horizontal arm, and thus fall down from the unloader. Considering the comparatively high capacity of such unloaders considerable quantities of the material may fall down from incompletely emptied pockets.

The subject invention has for its purpose to remedy this disadvantage found in the prior-art technology.

In accordance with the invention a filling arrangement for a bulk unloader thus is provided by means of which it becomes possible to turn the conveyor belt pockets towards each other and yet achieve efficient filling of the material into the belt pockets. Thus, it becomes possible to arrange for the transportation part of the belt to travel below the return part inside the horizontal arm, with the result that the return part pocket will open downwards, towards the upwardly open pockets of the transportation part. The advantage of this arrangement is that any material that may fall out of any incompletely emptied pockets in the return part will be guided into the pockets below in the transportation part and be carried by said part to the intended belt discharge station.

In this manner, undesired emptying of material from the unloader is avoided.

More precisely, the subject invention provides an arrangement whereby it becomes possible to fill inwardly-facing pockets of the kind indicated, in a safe and efficient manner.

The arrangement in accordance with the invention is characterised in that it comprises a filler wheel having an essentially horizontal main axis and arranged to be used specifically but not exclusively as a turning wheel at the lower end of a vertical arm in an unloader of the kind defined above. However, the filler wheel is generally useful also in other applications than in connection with the type of ship unloader described above.

In accordance with the invention, the filler wheel comprises two runners, which are rotatable about the main axis and against which belt edge portions of the conveyor belt abut, said pockets travelling between the runners with the pockets opening towards the interior of the filler wheel for receiving material supplied essentially axially via an inlet opening through a first one of said runners. In order to prevent the material supplied into the inlet opening from causing undesired clogging of the filler wheel and/or build-up of layers of material therein, and also to ensure that the material supplied is safely transferred into the pockets, the filler wheel comprises a tubular wall shaped as a frusto-conical member having a symmetry axis extending essentially in parallel with the main axis and being arranged to rotate about said symmetry axis. The frusto-conical member diverges in the direction from the inlet opening towards the pockets disposed between the runners, in order to guide the material into said pockets. By providing a rotating frusto-conical member of this kind any problems that might arise because of insufficient angles of repose will be eliminated, as will appear from the subsequent description of embodiments of the invention.

The main axis of the filler wheel about which the runners rotate, and the cone symmetry axis about which the frusto-conical member rotates, preferably coincide but could also be displaced with respect to one another. The above expression "essentially in parallel with" is intended to encompass both the case in which the axes are entirely parallel and the case in which the axes extend somewhat obliquely relatively to one another, however only up to a degree ensuring that the intended effect of the conical member is achieved.

It is possible to provide a separate drive means for the rotating frusto-conical member but the latter could also be connected to at least one of the runners in order to be caused to rotate. In accordance with one embodiment the frusto-conical member is rigidly connected to one of the runners in order to corotate therewith.

Preferably, the filler wheel has two frusto-conical members of the above kind, both of which are adapted to rotate about the main axis and arranged with their bases or larger ends facing one another and spaced axially apart, whereby the bulk material supplied through the inlet opening is guided down into the pockets by way of a gap formed between the conical members. In accordance with this embodiment, the conical members may be connected to a respective one of the runners at their small ends in order to be caused to rotate.

For mounting purposes, the filler wheel may comprise a tubular housing disposed about the main axis and having two end walls and an intermediate peripheral wall connected thereto. The inlet opening will then be provided in one of the end walls. The runners are rotatably mounted on a respective one of the end walls, and at its lower part the peripheral wall is provided with a outlet opening through which the material may pass from the conical member or members, down into the pockets.

Preferably, the filling arrangement in accordance with the invention also comprises a screw conveyor arranged for pendulum movements about the main axis of the filler wheel, said screw conveyor having a outlet opening at its upper end which opens into the inlet opening of the filler wheel and having a feed-in device at its lower end for feeding of material into the screw conveyor.

In accordance with a preferred embodiment of the invention the frusto-conical member, or members if two are provided, is/are adapted to rotate about its/their symmetry axis in a direction opposite to the rotational direction of the runners. An advantage obtained by the use of counter-rotating frusto-conical members is that the material filling operation may take place essentially at the return part of the conveyor belt moving into the filler wheel instead of at the exiting transportation part of the conveyor belt. In this manner, undesired spilover material from the exiting transportation part can be prevented, as will be clearly apparent from the subsequent description of embodiments of the invention.

EP-B1-0 284 154 illustrates extremely schematically (FIG. 9) a filling arrangement including double pendulum-movement screw conveyors, the discharge ends of which are facing one another towards a "cell belt" the pockets of which are said to face one another. However, this document provides no information regarding the function or construction of the arrangement in the area where the belt turns. More particularly, neither rotating runners nor rotating frusto-conical members of the kind described above are described or shown, and generally speaking the document does not disclose whether a filler wheel or similar device is provided.

The features of the above and other embodiments of the invention are defined in the appended claims.

The invention will be described in the following in greater detail by way of a preferred embodiment with reference to the accompanying drawings, wherein FIG. 10 is a sectional view of a frusto-conical member of the filler wheel in FIGS. 6 and 7, FIGS. 11A and 11B are an end view and a sectional view, respectively, of a runner of the filler wheel in FIGS. 6 and 7.

Figure 1:
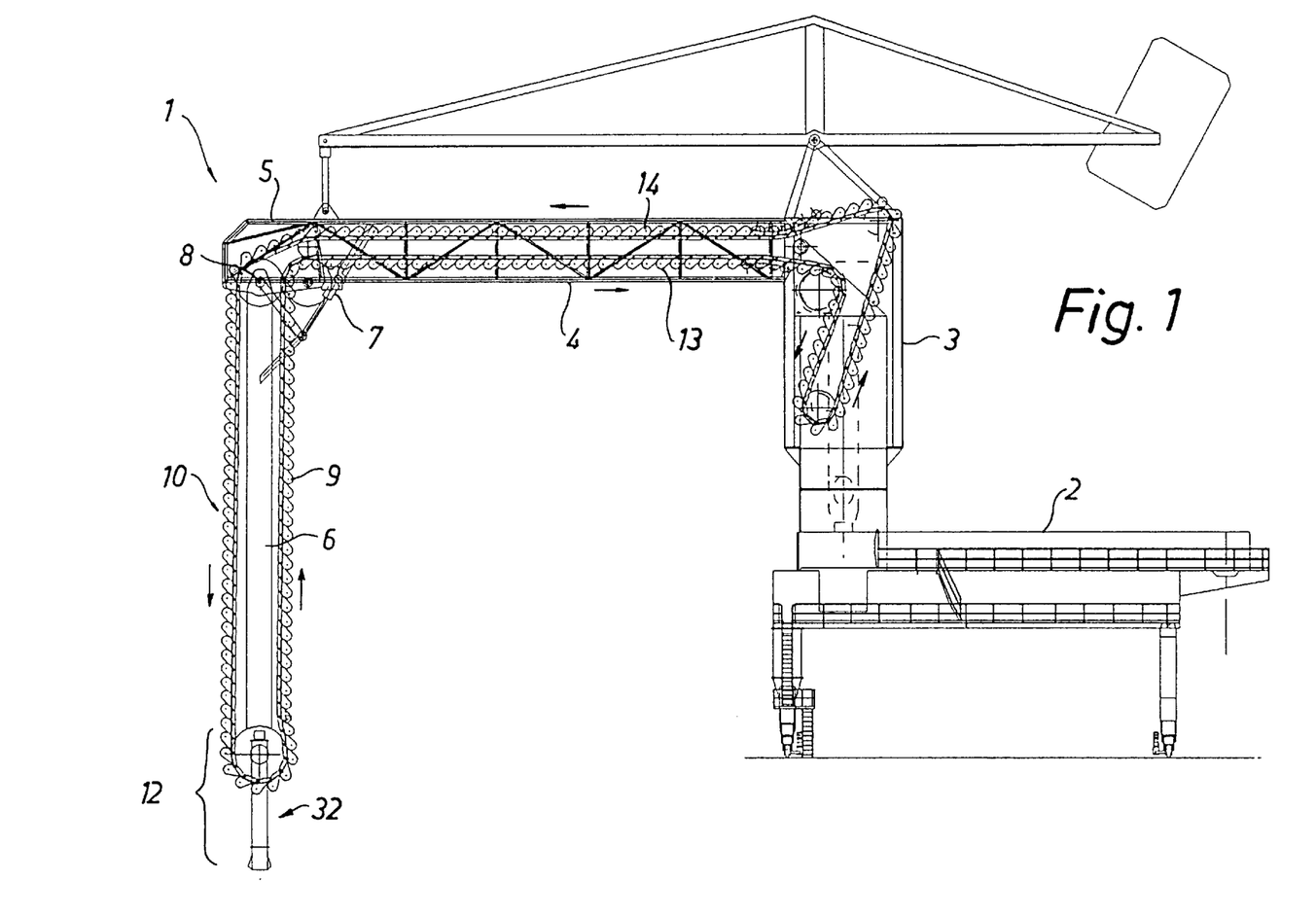
FIG. 1 illustrates a ship unloader provided with a filling arrangement in accordance with the invention.

FIG. 1, to which reference is initially made, schematically illustrates a ship unloader 1 for unloading bulk material, such as coal, e.g. from a ship hull (not shown). The unloader 1 comprises a travelling bridge crane 2, a tower 3, a horizontal arm 4 arranged to be vertically raised and lowered, a vertical arm 6 suspended from the outer end 5 of the horizontal arm, drive means 7 being arranged to actuate the vertical arm 6 for pendulum movements about a pendulum axis 8. Furthermore, the unloader 1 comprises a conveyor belt provided with material-receiving pockets 9 (see FIG. 3), said belt designated generally by reference numeral 10 and travelling in an endless path along the horizontal arm 4 as well as the vertical arm 6, and also an emptying device, not described in closer detail herein, adjacent the tower 3. At the lower end of the vertical arm 6, a filling arrangement 12 in accordance with the invention is provided for filling material into the pockets 9 of the belt 10. For a more detailed description of the emptying device at the tower 3 reference is made to Applicant's Swedish patent application SE 9502337-0, entitled "Emptying Arrangement for a Bulk Unloader", the disclosure of which is hereby incorporated by reference.

As indicated by arrows in FIG. 1, the transportation part 13 of the belt 10 travels along a lower path in the horizontal arm 4 whereas the return part 14 thereof travels at the top of the horizontal arm 4. This is illustrated in greater detail in FIG. 2 wherein the framework forming the horizontal arm 4 is indicated by reference numerals 15–19. A housing comprising sides walls 20 and 21 and an upper wall 22 encloses and is connected with the frame work 15–19. In the interior of the horizontal arm 4, lateral belt portions 23 of the conveyor belt 10 rest on free-running belt rollers 24 with the downwards open pockets 9 of the return belt part 14 being positioned straight above the upwardly open pockets 9 of the transportation belt part 13. Oblique lateral protective members 28 extend along the length of the horizontal arm 4, forming a channel for guiding any material that might fall down from incompletely emptied pockets 9 of the return part 14.

Figure 2:
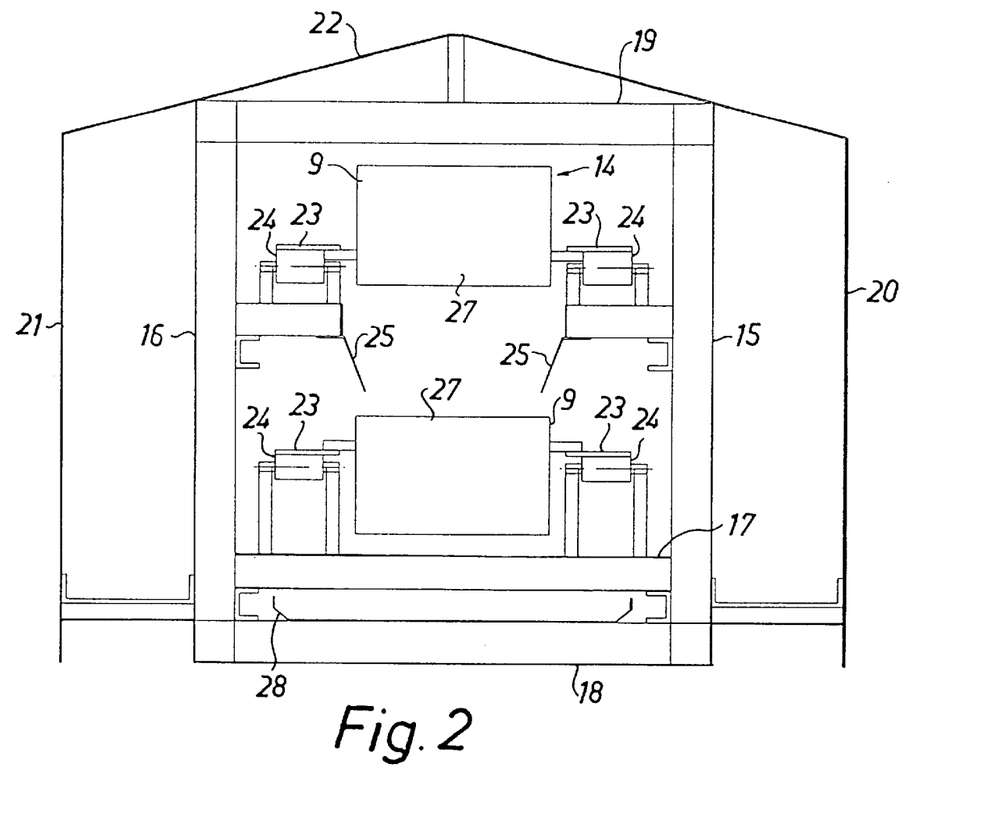
FIG. 2 is a cross-sectional view through a horizontal arm of the unloader in FIG. 1.
Figure 3:
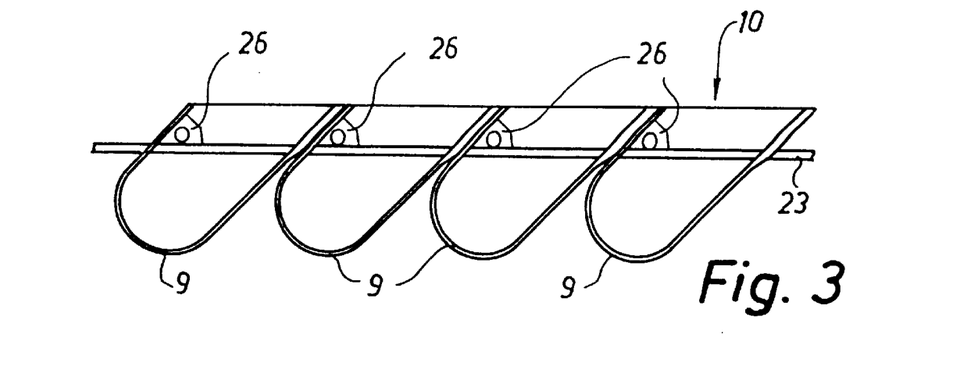
FIG. 3 is a longitudinal sectional view of a portion of a conveyor belt of the unloader in FIG. 1 provided with material-carrying pockets.

FIGS. 2 and 3 in combination illustrate the structure of the belt 10 to be used in the unloader 1 in FIG. 1. As already mentioned, the conveyor belt 10 comprises two lateral belt portions, one of which is illustrated in FIG. 3. Intermediate said lateral belt portions 23 extend triangular interconnection beams 26 to which the ends of the essentially U-shaped pockets 9 are connected. The sides of the pockets 9 are closed by side walls (not shown). A belt of this kind is marketed by Trelex Flexowell GmbH, Germany. Reference numeral 27 designates the open side of the pockets 9 and 28 designates a bottom trough extending in the longitudinal direction of the horizontal arm 4 to collect any material falling down.

Figure 4A:
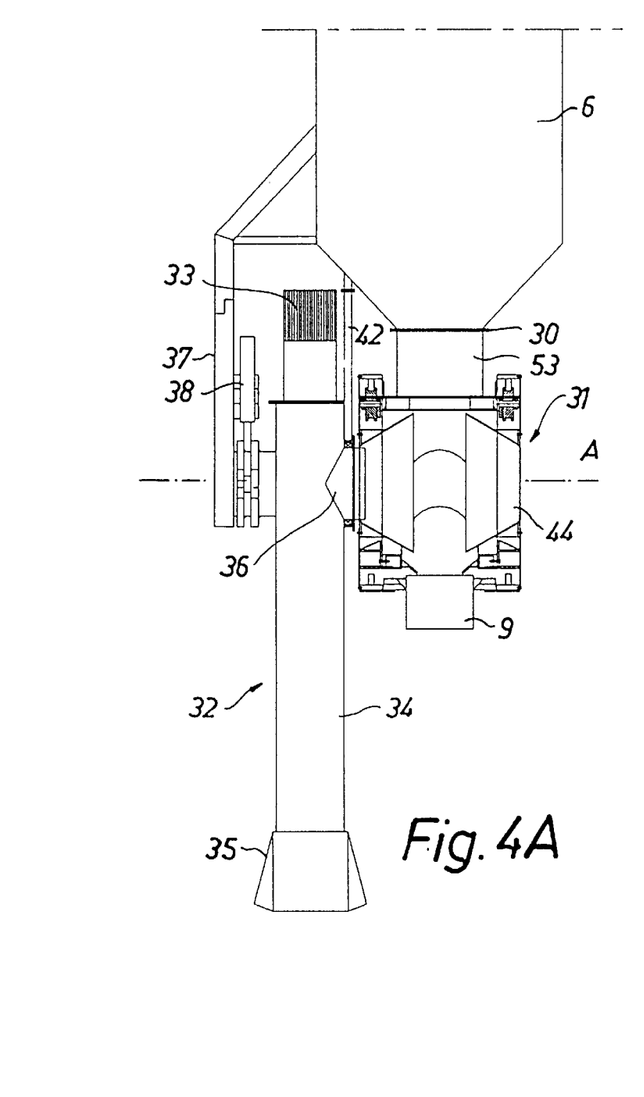
FIGS. 4A and 4B are a front view, partly in section, and a lateral view, respectively, of a first embodiment of a filling arrangement in accordance with the invention, to be used in the unloader in FIG. 1.
Figure 4B:
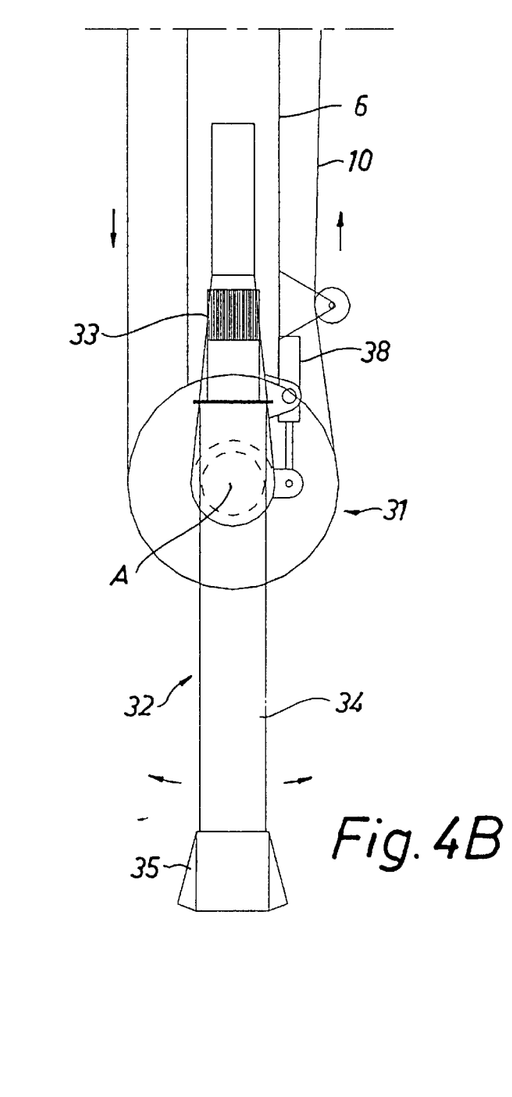

A first embodiment of the filling arrangement 12 in FIG. 1 will be described in detail with reference to FIGS. 4–11. Reference is initially made to FIGS. 4A and 4B and to FIG. 5. It should be noted that for the sake of clarity the pockets 9 are not shown in the lateral view in FIG. 4B. The stand of the vertical arm 6 supports, at its lower end, a filler wheel 31 by means of flange connection 30. The filler wheel 31 serves as a turning wheel for the conveyor belt 10 at the lower end of the vertical arm 6, the open side 27 of the pockets 9 being turned inwards, towards the filler wheel 31, as appears from FIGS. 4A and 5.

At one end wall of the filler wheel 31 a screw conveyor of a kind known per se, generally designated by 32, is provided, comprising a feed screw (not shown) driven by a motor 33, and a housing 34 enclosing the feed screw. At the lower end of the screw conveyor 32 a feed-in device 35, not described in any greater detail, is provided to feed bulk material into the screw conveyor 32. At its upper end, the screw housing 34 is formed with a peripheral outlet opening which is connected to the end wall of the filler wheel 31 by means of a short conduit 36.

The screw conveyor 32 is suspended in the stand of the vertical arm 6 by means of a support member 37 and arranged for pendulum movements about a main axis A of the filler wheel 31. The pendulum movement, which is indicated by double arrows in FIG. 4B and which is accomplished by means of a turning device 38, allows the feed-in device 35 to be set in an essentially perpendicular position relatively to the hull bottom, independently of the pendulum position of the vertical arm 6 relative to the vertical.

Figure 5:
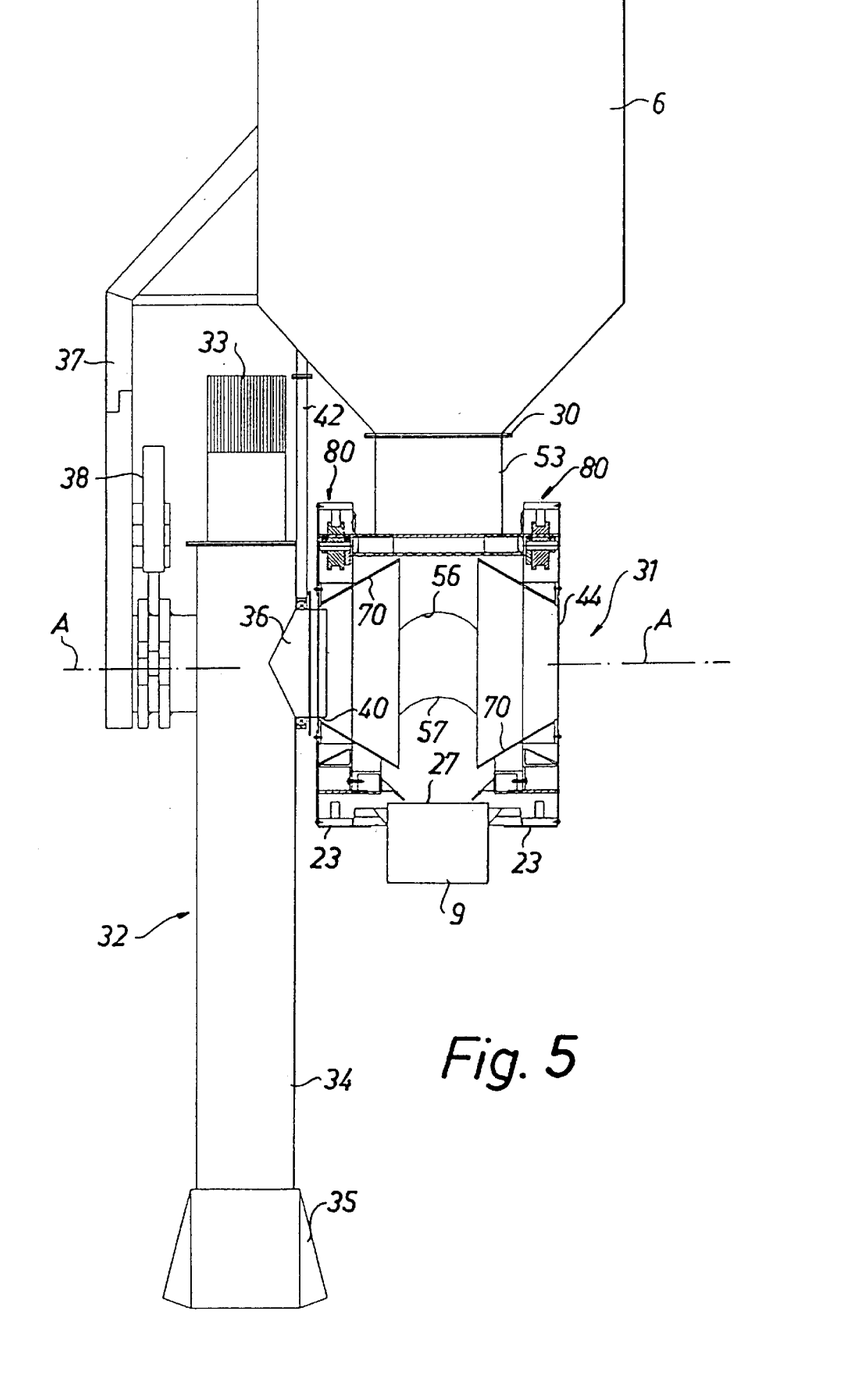
FIG. 5 illustrates the filling arrangement in FIG. 4A on an enlarged scale.

As most clearly apparent from FIG. 5 which illustrates the arrangement in FIG. 4A on an enlarged scale, an annular gap 4 exists between the outlet conduit 36 of the screw conveyor 32 and a material inlet opening in the end wall of the filler wheel 31. To this end, the conduit 36 is rotatably mounted in a bearing in a second support member 42 projecting downwards from the stand of the vertical arm 6.

The filler wheel 31 will now be described in greater detail, reference being firs t made to FIGS. 8–11 illustrating the components of the wheel 31 in an unassembled condition.

The filler wheel 31 comprises a tubular housing 50, two wheel holders 60, two truncated cones 70 and two runners 80.

Figure 8A:
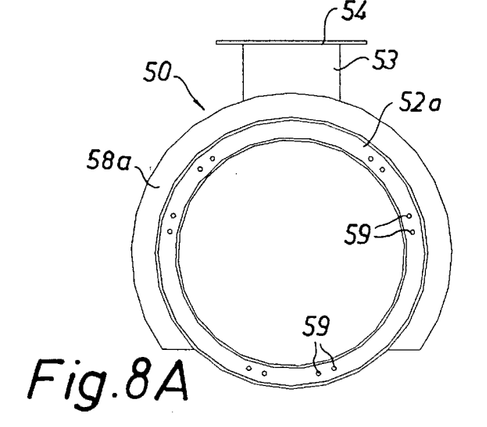
Figure 8B:
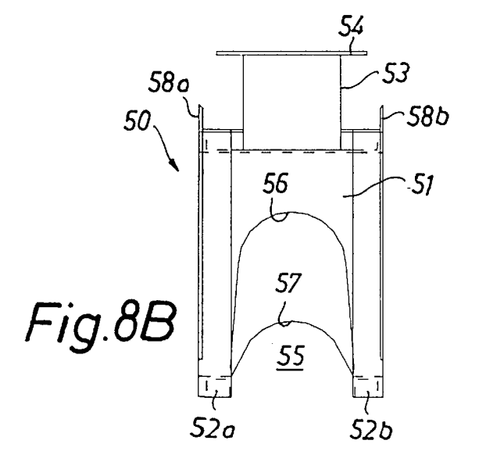

The tubular housing 50 is formed by a cylindrical peripheral wall 51 and two end walls 52a, 52b in the form of annular tubular beams, and a beam connection means 53 upstanding from the upper side of the peripheral wall 51 and including an connection flange 54 to produce the flange connection 30 illustrated in FIGS. 4A and 5. At its bottom, the peripheral wall 51 is provided with a circumferentially extending material outlet opening 55 which, as illustrated in FIG. 8B, extends upwardly on both sides of the peripheral wall 51. However, the outlet opening 55 extends to a somewhat higher level on the ascending side of the belt as indicated at 56, i.e. on the side on which the filled pockets 9 travel. The reason for this arrangement is to ensure that any projecting material will be allowed to drop back into the filler wheel 31 for reintroduction into another pocket 9. The end 57 opposite to the outlet opening 55 determines when the filling of the pockets may start as the latter are traveling around the filler wheel 31. The configuration of the outlet opening 55 may, however, be different in accordance with the embodiment of the invention to be described below and comprising counter-rotating frusto-conical members.

In addition, the housing 50 is provided with a protective flange 58a, 58b on each one of the end walls 52a, 52b and as will appear from the following, said flanges serve to prevent material from reaching wheel races in the filler wheel 31.

Finally, the two end walls 52a, 52b are also provided with bolt apertures 59 for establishing a bolt connection with an associated wheel holder 60, as will be described with reference to FIGS. 9A and 9B.

A wheel holder 60 comprises a circular ring or flange 61 having essentially the same diameter as the end walls 52a, 52b of the housing 50 and presenting bolt apertures 62 matching the bolt holes 59 of the housing 50. Further, the wheel holder 60 has three symmetrically disposed and freely rotatable flanged wheels 63 the peripheries of which project somewhat beyond the flanged ring 61 and which are provided with circumferential grooves 64. The flanged wheels 63 are rotatably mounted on the flange 61 with the aid of angle irons 65 and oblique profile sections 66.

Figures 9A, 9B, 10, 11A, 11B:
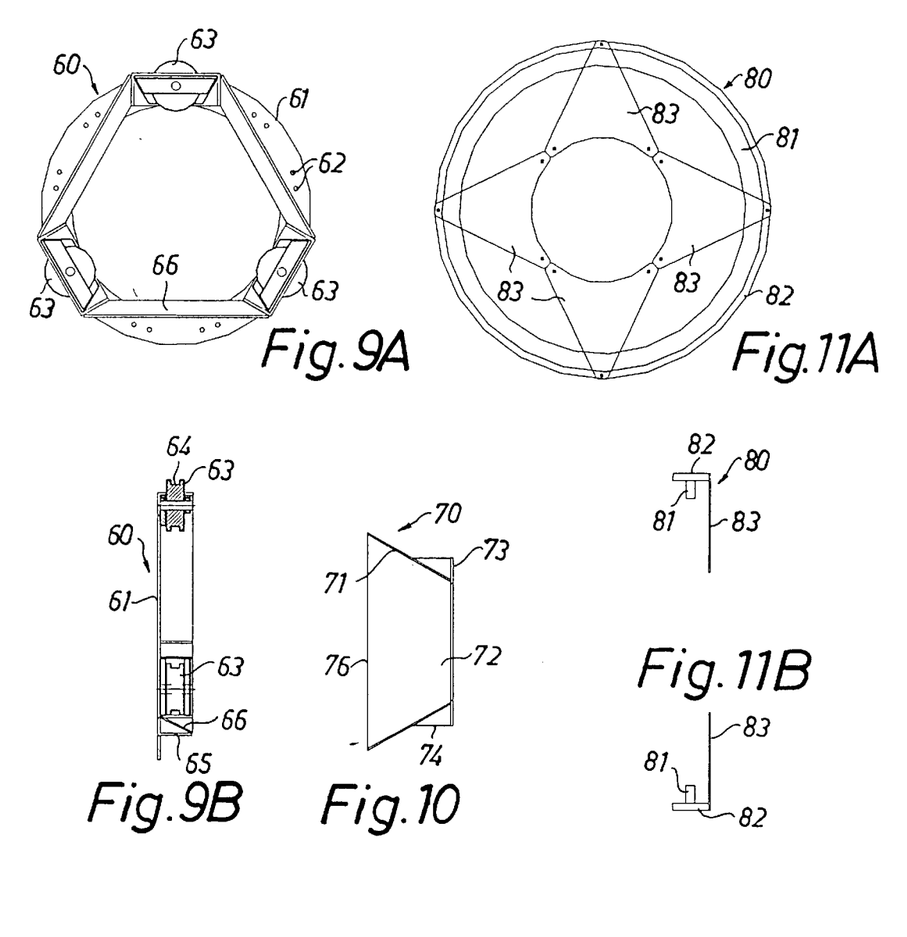

Each cone 70 of the filler wheel 31, one of which is illustrated in FIG. 10, consists of a tubular wall 71 in the form of a cylindrical frusto-conical member the small end 72 of which has a radially projecting annular connection flange 73 including a rigidifying element 74 which is turned towards the external face of the conical member 71. The height of the conical member 71 is so adapted to the axial length of the housing 50 that in its assembled condition the filler wheel 31 (FIG. 6) presents a gap 75 between the bases 76 of the conical members 70. In addition, the diameter of the bases 76 of the conical members 70 is slightly smaller than the internal diameter of the end walls 52a, 52b and the peripheral wall 51 of the tubular housing 50.

The two runners 80 of the filler wheel 31, one of which is illustrated in FIGS. 11A and 11B, on the one hand as an essentially T-shaped transverse section formed from a radial rail ring 81 for engagement with the circumferential groove 64 of the flanged wheel 63, and also a circular outer portion 82 forming the race on which the belt portions 23 run. The diameter of the runner 80 is so adapted to the flanged wheels 63 that the runner, in a manner similar to the outer race of a roller bearing, runs on said flanged wheels 63. In addition, each runner 80 has four triangular cone supporting plates 83 which are secured to the outer portion 82 of the runner 80 at one of their ends, whereas their radially inwardly directed corners are arranged to be connected to a conical member 70 via the connection flange 73. The structure including the separate plates 83 is advantageous compared to the alternative of using one continuous annular plate inasmuch as material that may enter into the wheel holder may be efficiently guided outwards through the gaps between the plates 83.

Figure 6:
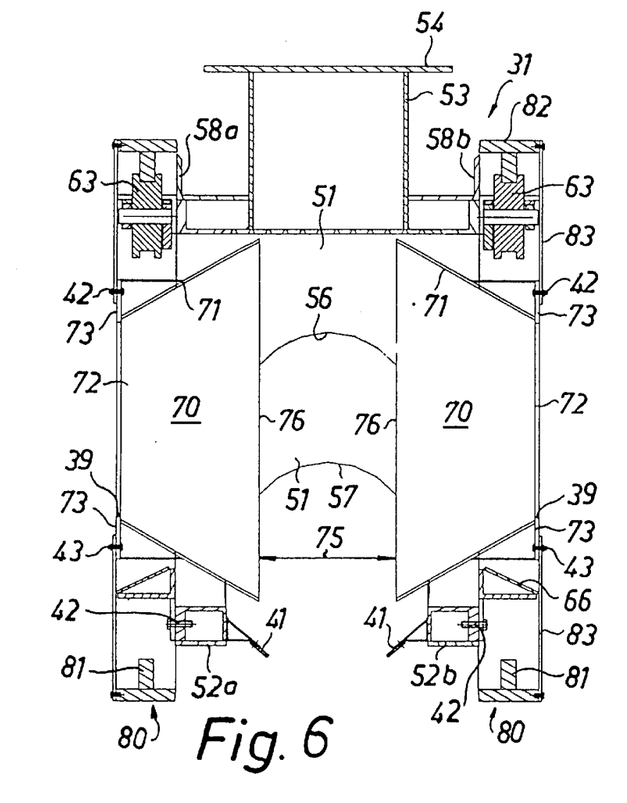
FIGS. 6 and 7 are a front sectional view and a lateral view, respectively, of the filling arrangement illustrated in FIGS. 4A and 4B, FIGS. 8A and 8B are an end view and a lateral view, respectively, of a housing for the filler wheel in FIGS. 6 and 7, FIGS. 9A and 9B are an end view and a sectional view, respectively, of a wheel holder in the filler wheel in FIGS. 6 and 7.
Figure 7:
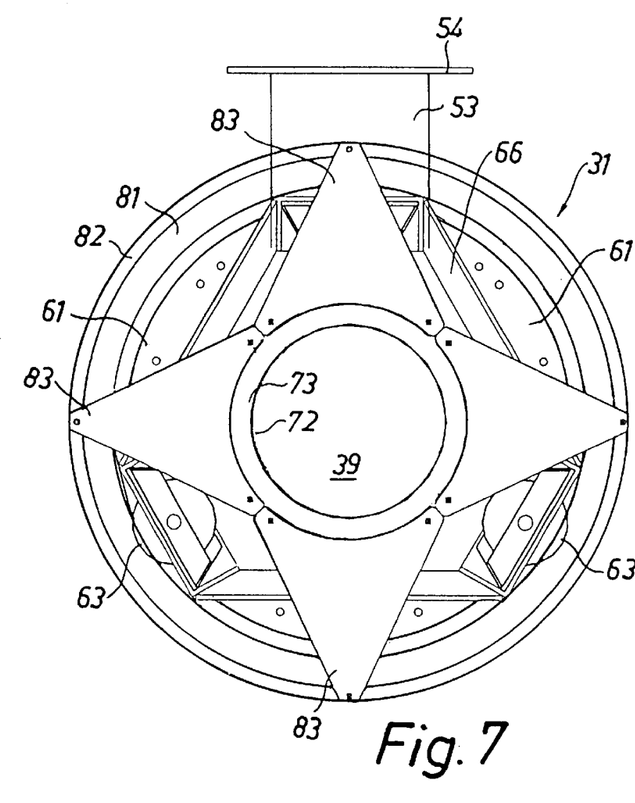

Reference is now made to FIGS. 6 and 7 illustrating the assembled filler wheel 31, seen in a sectional view from the front and in an end view from one end wall, respectively. In accordance with its basic embodiment illustrated in FIG. 6 the filler wheel 31 has one inlet opening 39 in each end wall 52a, 52b. However, in the embodiment in FIGS. 1, 4A, 4B and 5 one inlet opening is closed by a plate (not shown) which is mounted at reference numeral 44 in FIGS. 4A and 5. These inlet openings 39 thus coincide with the small ends 72 of the conical members 70 the facing bases 76 of which are spaced apart by a distance 75 as mentioned above, whereby material supplied through one or both inlet openings 39 may be guided by the conical members 70 down into the outlet opening 55 of the housing 50 and further down into the upwardly open pockets 9 (not shown in FIG. 6). For this purpose oblique sealing strips 41 are also provided, which are mounted on a respective one of the end walls 52a, 52b, at least at a lower part of the outlet opening 55.

FIGS. 6 and 7 illustrate the manner in which the interconnection flanges 61 of the wheel holders 60 by means of bolt joints 42 are secured to the end walls 52a, 52b of the housing 50, using the holes 59. In addition, these Figures illustrate the manner in which the conical members 70 are supported by one runner 80 each, with the aid of the star-shaped arrangement of the cone supporting plates 83 and the cone connection flanges 73 and the bolt joint 43. Owing to this arrangement each conical member 70 will rotate together with its associated runner 80.

FIG. 6 also illustrates the manner in which the protective flanges 58a and 58b efficiently protect the flanged wheels 63 and the rail rings 81 from any dropping material.

The fact that the conical members 70 rotate inside the filler wheel 31 ensures that the material supplied by the screw conveyor 32 through the inlet opening 39 is satisfactorily guided into the pockets 9. More precisely, no problems concerning the angles of repose will arise, since material that for any reason does not fall into the pockets by itself will be entrained by the rotating conical members 70 and therefore leave the latter at least when it reaches the upper part of the filler wheel 31. The arrangement makes it possible to provide stationary, interior scraper devices (not shown) inside each conical member.

The primary reason for providing the filler wheel 31 with two conical members is the fact that material discharged from the screw conveyor 32 may enter the filler wheel 31 at different velocities. Low-velocity material, which could be said to more or less gush into the filler wheel, will be guided by the left-hand conical member 70 as seen in FIG. 4A whereas higher-velocity material, which will more or less be thrown into the filler wheel 31, will be guided by the right-hand conical member 70 as seen in FIG. 4A.

Figure 12:
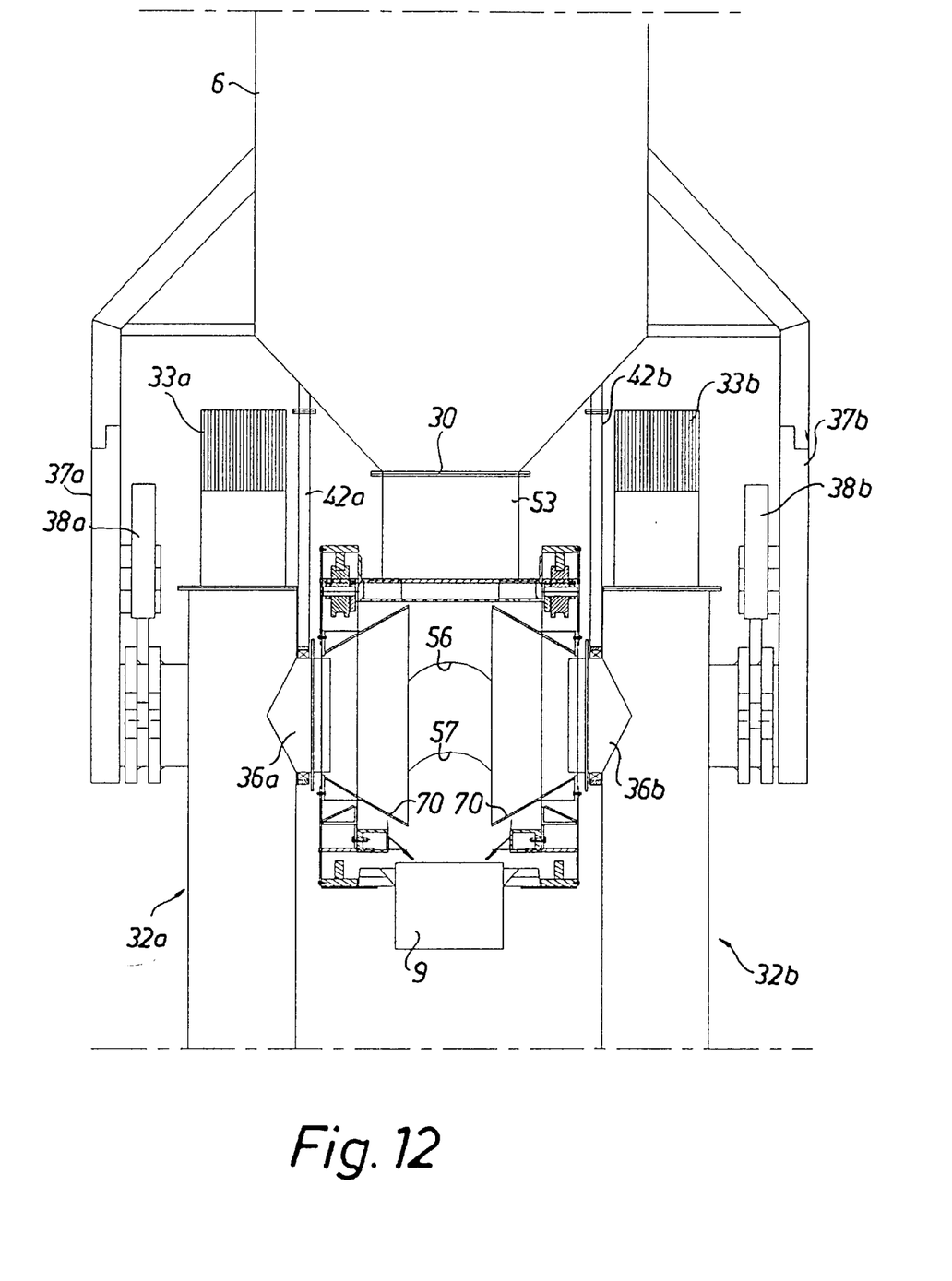
FIG. 12 is a view corresponding to FIG. 5 but illustrates a second embodiment of a filling arrangement in accordance with the invention, including double inlet openings and double screw conveyors.

Reference is now made to FIG. 12 illustrating a second embodiment of the filling arrangement 12 according to which both inlet openings 39 are used and, to this end, the vertical arm 6 supports two screw conveyors 32a, 32b arranged for pendulum movement, each one equipped with its pendulum-imparting cylinder 38a, 38b. In this manner it becomes possible specifically to pendulate the screw conveyors 32a, 32b in different directions to accomplish an efficient unloading.

Figure 13:
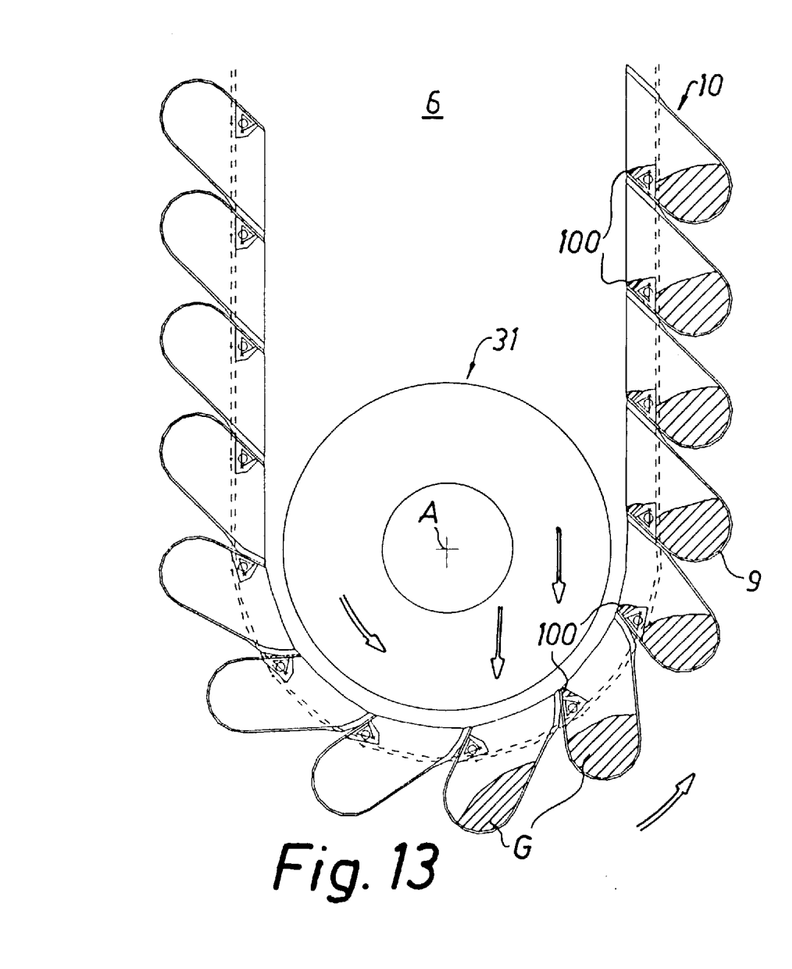
FIG. 13 is a schematic fragmentary lateral sectional view, illustrating the manner in which the conveyor belt is being filled with the aid of a filling arrangement in accordance with the first embodiment according to FIGS. 4–11.

FIG. 13 is a schematic representation of the manner in which the material is filled onto the conveyor belt 10 by means of the above-described embodiments of the filling arrangement in accordance with the invention. As a result of the conical members 70 corotating with the runners 80 the material present on the conical members 70 will be entrained thereby in their rotational direction, i.e. counter-clockwise as seen in FIG. 13, in the direction of the movement of the ascending transportation part of the conveyor belt 10. The material, indicated by G in FIG. 13, thus will be filled into the pockets 9 approximately in the manner illustrated in that Figure. Due to the construction of the belt 10 (see FIG. 3) small "shelves" 100 will, however, form in the ascending transportation part, on top of the triangular interconnection beams 26 of the belt 10. Because the material G places itself on top of these shelves 100 it may drop from the ascending transportation part of the belt 10 as unwanted spilover material. However, this disadvantage may be eliminated, or at least be essentially reduced, if the conical member(s) and the conveyor belt 10 are caused to rotate in opposite directions.

Figure 14:
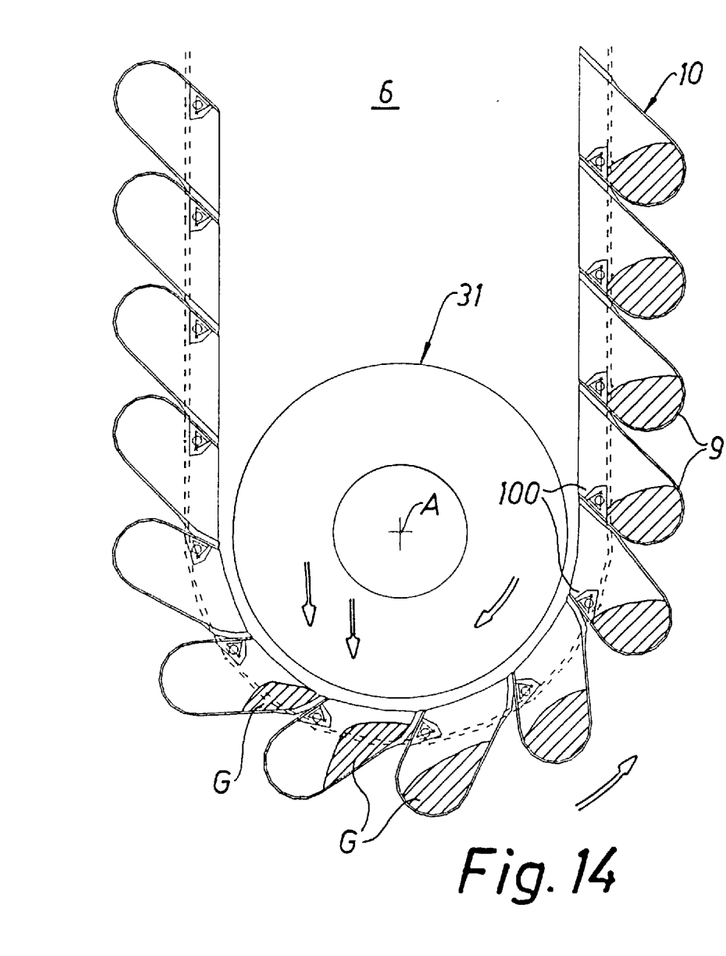
FIG. 14 is a schematic fragmentary lateral sectional view illustrating the manner in which the conveyor belt is being filled with the aid of a filling arrangement in accordance with the third or fourth embodiments according to FIGS. 15–18, FIGS. 15 and 16 are a sectional view and a lateral view, respectively, of a filler wheel having counter-rotating frusto-conical members in accordance with a third embodiment of the filling arrangement of the invention.

If the conical members 70 are caused to rotate in the opposite direction to that of the runners 80 the material present on the conical members 70 will be entrained thereby obliquely upwards towards the incoming return part of the belt 10, i.e. clockwise as seen in FIG. 14. Consequently, in accordance with FIG. 14 the filling of material into the pockets will be effected essentially in the descending part of the belt 10, where the "shelves" 100 referred to above do not exist. The above-mentioned problems with spilover material thus is avoided. In this connection it should also be noted that the filling of the pockets essentially will become independent of the actual pendulum angle of the vertical arm 6 of the unloader, i.e. the material will be deposited in each individual pocket 9 as the latter assumes the correct position relatively to the vertical.

Figure 15:
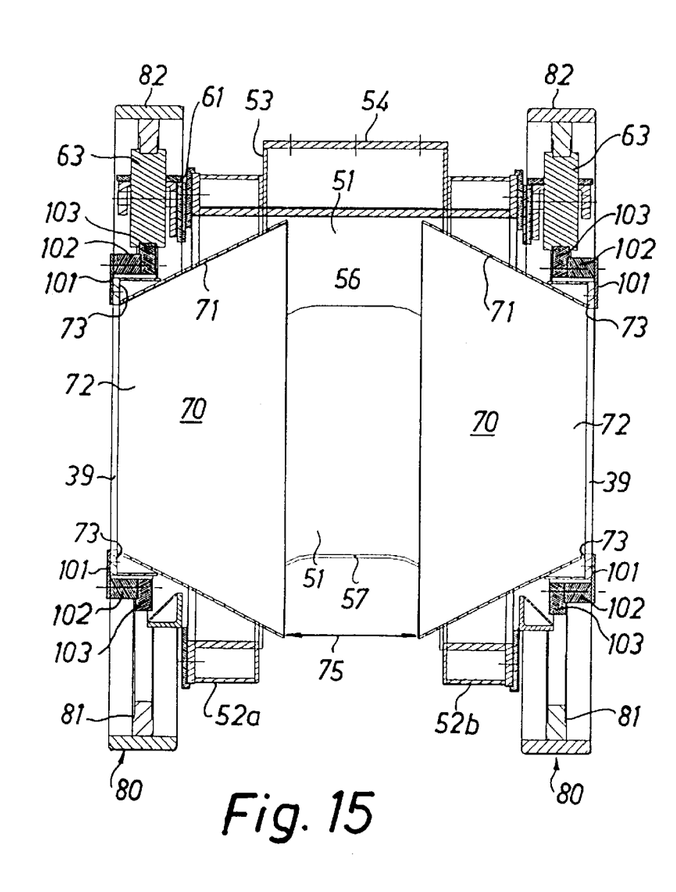
Figure 16:
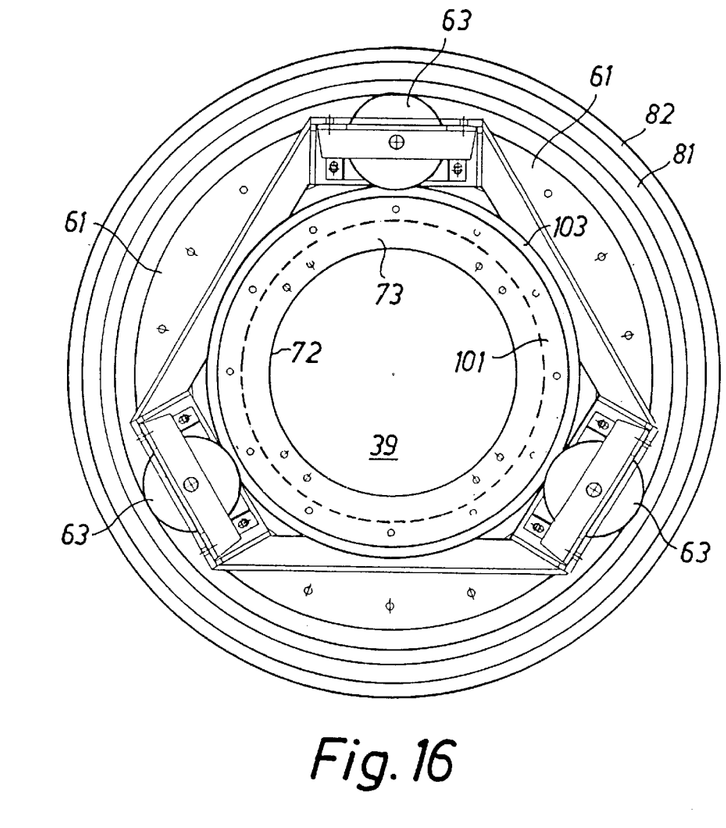

FIGS. 15 and 16 illustrate a filler wheel including counter-rotating frusto-conical members in accordance with a third embodiment of the filling arrangement of the invention. Components that are identical with or correspond to the components of the filler wheel in accordance with FIGS. 4–11 have, for the sake of simplicity, the same reference numerals and the description of their function will not be repeated.

The filler wheel in accordance with FIGS. 15 and 16 is characterised in that the cone supporting plates 83 have been omitted, and in that the counter-rotating conical members 70 instead are driven by the runners 80 via the flanged wheels 63. More precisely, the annular connection flange 73 of each conical member 70 is connected to the radially inner portion of an annular external plate 101 by means of bolt joints. At its radially outer part the external plate 101 is connected to an interior ring 103 via an intermediate ring 102 by means of bolt joints. The interior ring 103, which thus is rigidly connected to its associated conical member 70, has such a width and external radius that it fits into the flanged wheels 63 so as to be driven thereby. In practise, only the two lower flanged wheels 63 will be driving wheels whereas the upper flanged wheel 63 will serve merely as a lateral guide.

In accordance with one embodiment the inner ring 103 is divided to facilitate its mounting onto the flanged wheel 63. For instance, it may be divided into three parts, extending through 90°, 90°, and 180°, respectively. By using an unbroken intermediate ring 102 the parts of the inner ring 103 may be joined together by means of the above-mentioned bolt joints to form a continuous inner ring 103. However, it is equally possible to use an unbroken inner ring 103, which may however require a different sequence of the component assembly steps.

Figure 17:
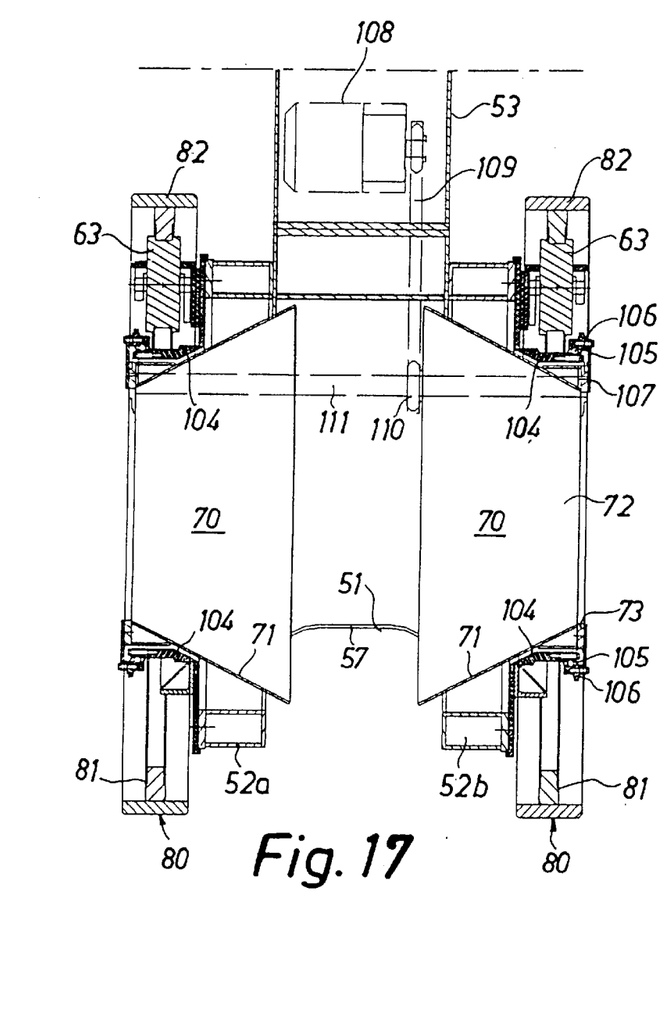
FIGS. 17 and 18 illustrate in sectional views as seen respectively from the front and from the side, a filler wheel including counter-rotating and separately driven frusto-conical members of a fourth embodiment of the filling arrangement in accordance with the invention.
Figure 18:
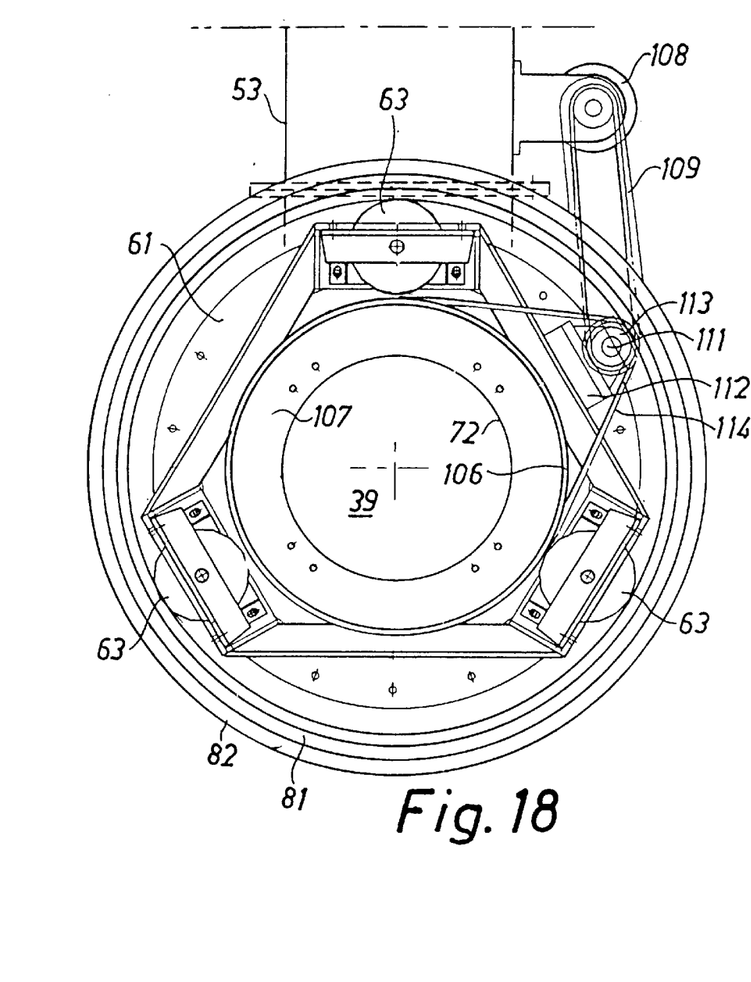

FIGS. 17 and 18 illustrate a filler wheel comprising counter-rotating frusto-conical members in accordance with a fourth embodiment of the filling arrangement of the invention. The filler wheel in FIGS. 17 and 18 is provided with a separate drive means for the counter-rotating conical members 70. For this purpose one inner ring 104 for each conical member 70 is rigidly connected to the flange 61 of the wheel holder 60, which flange, via a bearing 105, runs on an outer ring 106. The outer ring 106 is in turn rigidly connected to the connecting flange 73 of the conical member 70 via an annular plate 107 and bolt joints. In this manner, the conical member 70 becomes freely rotatable relatively to the wheel holder 60, without any driving contact with the flanged wheels 63. A suitable motor 108 is provided to drive the conical members 70, as illustrated schematically in FIG. 17. The output shaft of the motor 108 is via a chain 109 connected to a gear 110 rigidly mounted on a drive shaft 111 rotatably mounted in a bearing cage 112. In turn, the drive shaft 111 drives two gears 113, one at either end of the shaft 111, while said gears in turn via a chain 114 drive a respective one of the above-mentioned outer rings 106, the latter for this purpose being formed with teeth on their external faces.

Obviously, the above separate-drive arrangement could be used also in the case of corotating cones.

Figure 19:
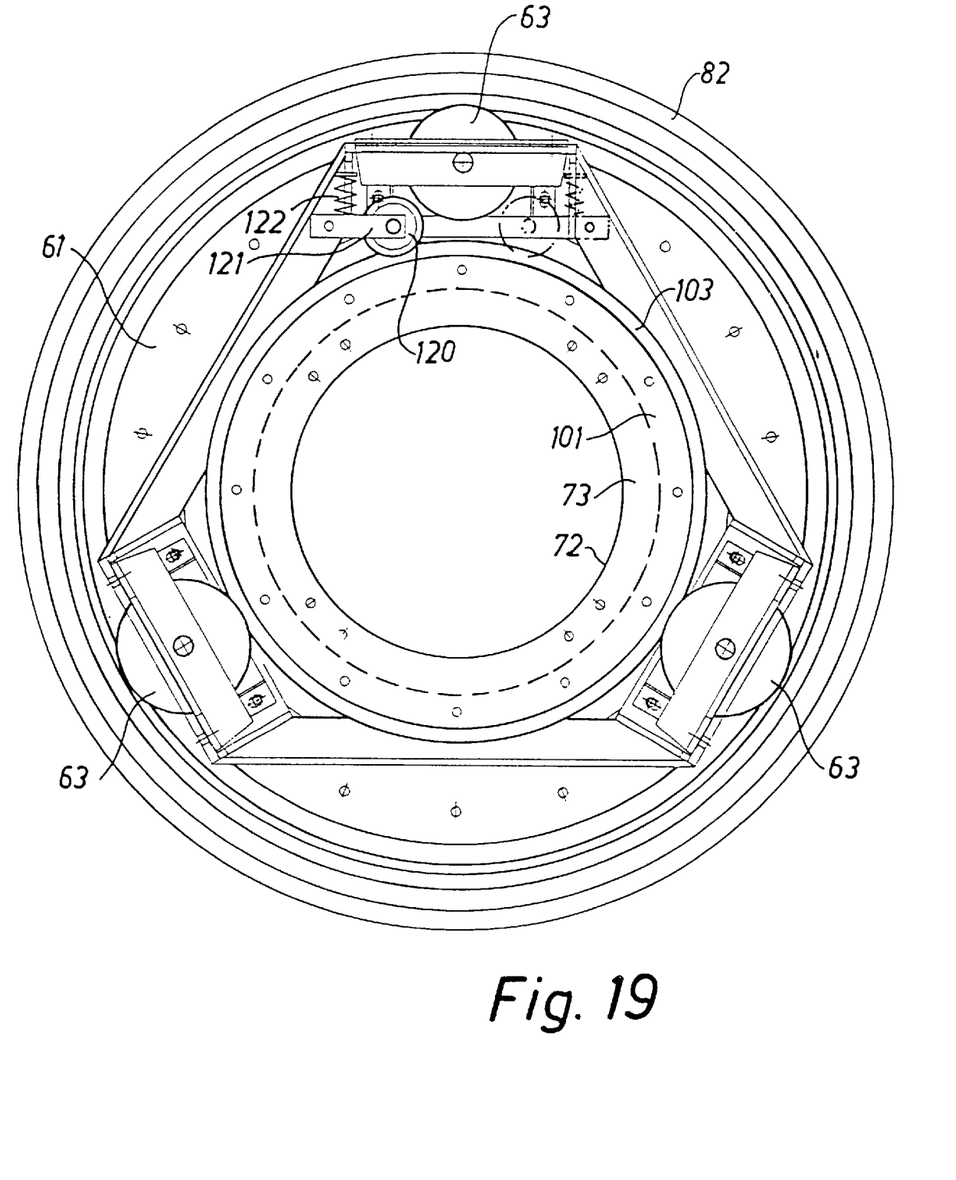
FIG. 19 is a lateral view of a filler wheel in accordance with the fifth embodiment of the filling arrangement in accordance with the invention.

FIG. 19 illustrates a modification of the filler wheel in FIGS. 15 and 16. During the assembly of the unloader the uppermost flanged wheel 63 in FIG. 16 is initially supporting, i.e. it supports the weight of the runners 80 and of the conical members 70. However, after mounting and tightening the belt 10 this weight will instead be taken by the belt 10, and the uppermost flanged wheel 63 will have a lateral guiding function only. Owing to this arrangement it becomes possible to choose a smaller diameter-sized upper flanged wheel, alternatively to move it upwards, into contact only radially outwards with the rail ring 81 of the runner 80. A. modification of this nature is illustrated in FIG. 19. In this case, the filler wheel may be supplemented by a second upper wheel 120, which abuts against and laterally guides the inner ring 103. As schematically illustrated in FIG. 19 this second wheel 120 is mounted on a pivotable bracket 121 which by means of a spring means 122 is positively urged against the inner ring 103 in order to ensure that correct abutment conditions exist between the wheel 120 and the inner ring 103, independent of any presence of dirt or other particles on the tread. As illustrated in FIG. 19 two additional wheels 120 of this kind may be provided, each having its own bracket 121 and its own spring means 122.

Owing to the above modification including double wheels at the upper location, the radial positions of the two upper wheels 63 and 120 may be set individually, ensuring correct play. An obvious advantage with the provision of double wheels at the top is that the wheels will never will be stationary, which prevents jamming, as may otherwise occur, for instance because of corrosion.

Another advantage with the embodiment including double upper wheels is that it facilitates assembly. The three flanged wheels 63 may be mounted initially in abutment against the rail ring 81. Thereafter, the inner rings 103 together with the conical members 70 are put in position relatively to the wheels 63, whereupon the second upper wheel 120 is mounted.

The invention has now been described with reference to preferred embodiments but the filling arrangement in accordance with the invention may be modified in many ways within the scope of the appended claims.

For instance, the arrangement may be used also in situations where no screw conveyor is used for the feed-in. In certain applications one of the frusto-conical members may be omitted. In addition, the conical members need not necessarily have a cylindrical shape.

In accordance with one particularly interesting modification the cone symmetry axis is displaced relatively to the main axis A of the filler wheel in the direction towards the descending return part of the belt 10. This may be achieved by choosing a smaller diameter of the lower left-hand flanged wheel 63 in FIG. 16. Any dirt that may enter between the belt 10 and the external face of the conical members 70 will be entrained by the belt 10 in the direction towards a space diverging in the direction of belt travel. This prevents dirt from being wedged by the belt 10. A very minor lateral displacement of the inner ring 103 may be sufficient to obtain this advantageous release effect.

I claim:

1. A filling arrangement (12) for a bulk unloader (1) having a conveyor belt (10) travelling in an endless path and provided with material receiving pockets (9), characterised by a filler wheel (31) having an essentially horizontal main axis (A) and comprising:
    two runners (80) which are rotatable about the main axis (A) and against which lateral belt portions (23) of the conveyor belt (10) abut, wherein said pockets (9) are travelling between the runners (80) and are open towards the interior of the filler wheel (31) for receiving material being supplied essentially axially via an inlet opening (39) through a first one of said runners (80), and
    a tubular wall in the shape of a frusto-conical member (70), which has a symmetry axis extending essentially in parallel with said main axis (A) and which is arranged to rotate about said symmetry axis, said frusto-conical member (70) diverging from the inlet opening (39) towards the pockets (9) disposed between the runners (80), in order to guide the material into said pockets.

2. An arrangement as claimed in claim 1, wherein said conical member (70) is arranged to rotate about its symmetry axis in the same direction as the runners (80).

3. An arrangement as claimed in claim 2, wherein said conical member (70) is rigidly connected to at least one of said runners (80) in order to be caused to rotate in the same direction as said runners (80).

4. An arrangement as claimed in claim 1 wherein at least three circumferentially spaced flanged wheels (63) are arranged interiorly of each runner (80) for rotatably mounting a respective one of said runners (80).

5. An arrangement as claimed in claim 1, wherein the conical member (70) is arranged to rotate about its symmetry axis in a direction opposite to the rotational direction of said runners (80).

6. An arrangement as claimed in claim 5, wherein said conical member (70) is coupled to at least one of said runners (80) via a torque transferring means (63) in order to be caused to rotate in the opposite direction to the rotational direction of said runners (80).

7. An arrangement as claimed in claim 6, wherein at least three circumferentially spaced flanged wheels (63) are arranged interiorly of each runner (80) in order to rotatably support a respective one of said runners (80), said torque transferring means being formed by said flanged wheels (63), and wherein said wheels, on their radially outer side, are driven by said runners (80) and, on their radially inner side, drive the conical member (70) in a rotational direction opposite to the rotational direction of said runners (80).

8. An arrangement as claimed in claim 1, wherein said conical member (70), in order to be caused to rotate, is drivingly coupled to a separate drive means (108).

9. An arrangement as claimed in claim 1, wherein the filler wheel (31) is provided with two frusto-conical members (70) as defined above, both being arranged to rotate in the same direction about their symmetry axis (A) with their bases (76) facing each other and being axially spaced apart, whereby the material supplied through the inlet opening (39) is guided into the pockets (9) via a gap (75) formed between said conical members (70).

10. An arrangement as claimed in claim 9, wherein each one of said conical members (70), in order to be caused to rotate, is connected at its small end (72) to a respective one of said runners (80).

11. An arrangement as claimed in claim 1, wherein the main axis (A) of the filler wheel (31) coincides with the symmetry axis of the conical member(s) (70).

12. An arrangement as claimed in claim 1, wherein the main axis (A) of the filler wheel (31) is displaced relatively to the symmetry axis of the conical member(s) (70).

13. An arrangement as claimed in claim 1, wherein said filler wheel (31) further comprises a tubular housing (50) disposed about the main axis (A) and having two end walls (52a, 52b) and an intermediate peripheral wall (51) connected to said end walls, the runners (80) being rotatably mounted on a respective one of said end walls (52a, 52b) and the peripheral wall (51) being provided at a lower part with an outlet opening (55) through which the material is intended to pass on its way from the conical member(s) (70) down into the pockets (9).

14. An arrangement as claimed in claim 1, wherein the filler wheel (31) is arranged as a turning wheel at the lower end of a vertical arm (6) of the unloader (1), said arrangement further comprising a screw conveyor (32) arranged for pendulum movement about the main axis (A) of the filler wheel (31), said screw conveyor having, at its upper end, an outlet opening (36) opening directly into the inlet opening (39) of the filler wheel (31) and, at its lower end, a feed-in device (35) for feeding material into said screw conveyor (32).

15. An arrangement as claimed in claim 14, wherein a gap (40) is present between the screw conveyor (32) and the filler wheel (31) in order to prevent external forces, which may affect the screw conveyor (32) during the unloading operation, from being transmitted to the filler wheel (31).

* * * * *